UNITED STATES PATENT OFFICE.

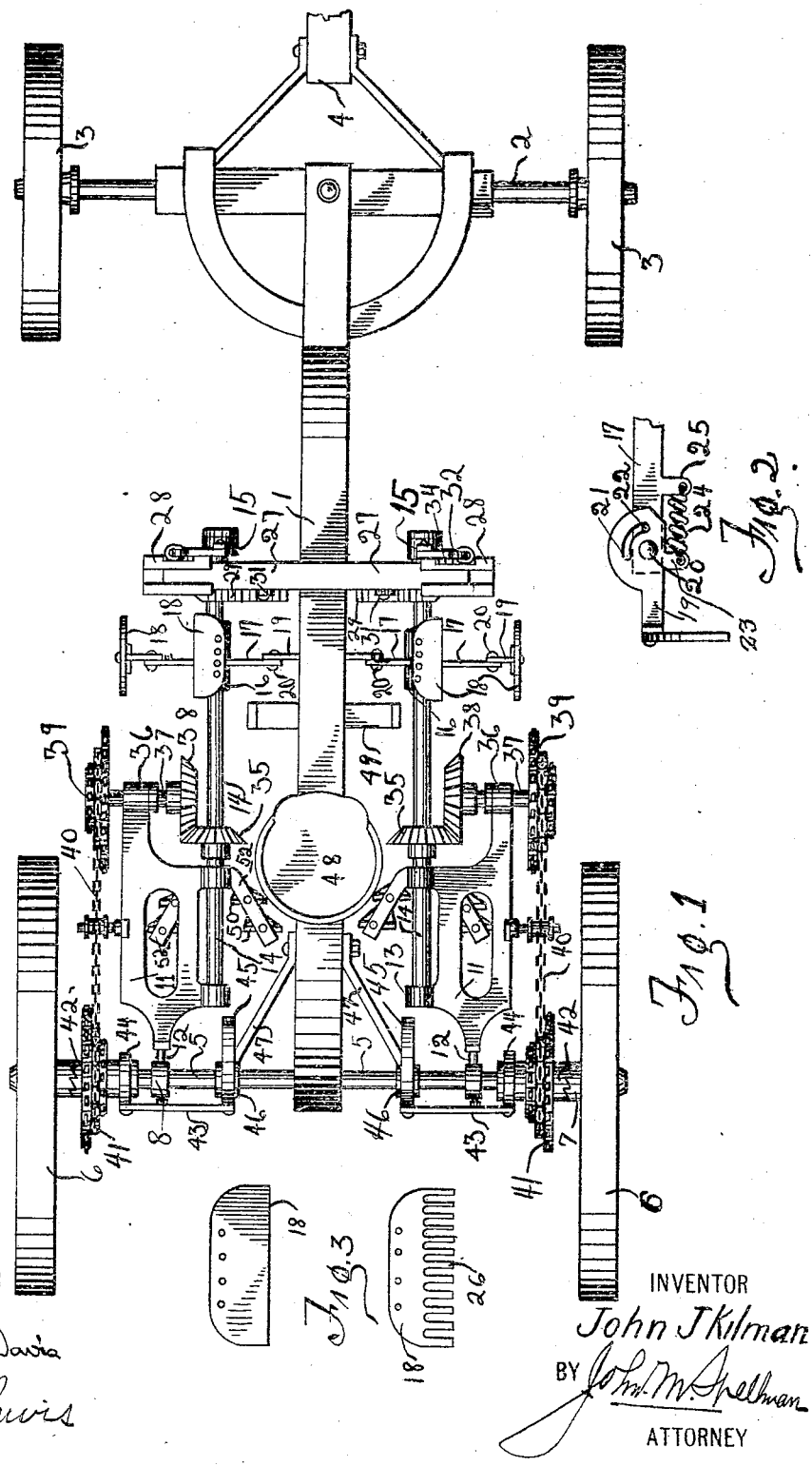

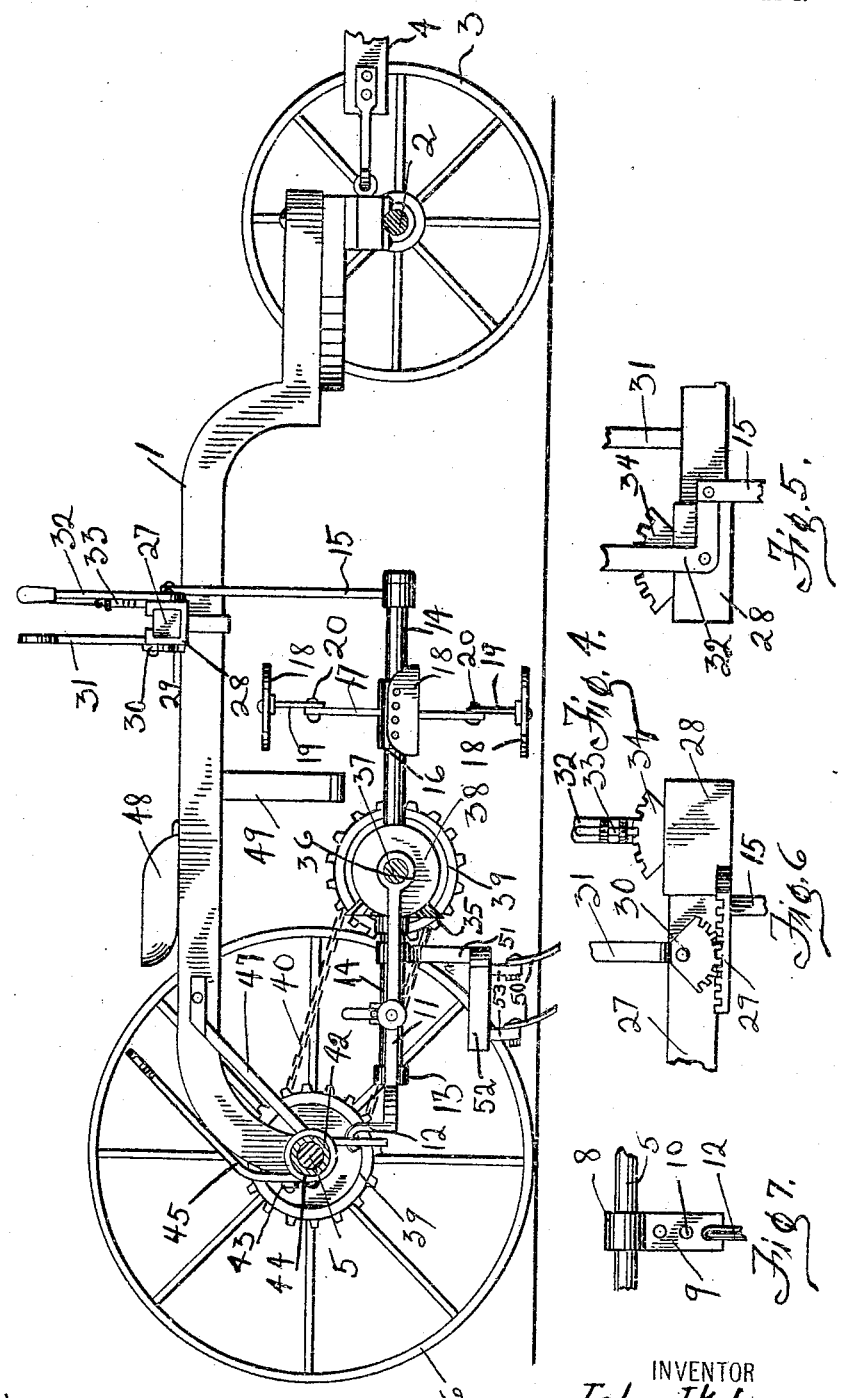

JOHN J. KILMAN, OF FERRIS, TEXAS, ASSIGNOR OF ONE-HALF TO J. R. McCOWN, OF FERRIS, TEXAS.

CHOPPING-MACHINE.

948,510.  Specification of Letters Patent.  Patented Feb. 8, 1910.

Application filed June 30, 1908. Serial No. 441,091.

*To all whom it may concern:*

Be it known that I, JOHN J. KILMAN, citizen of the United States, residing at Ferris, in the county of Ellis and State of Texas, have invented certain new and useful Improvements in Chopping-Machines, of which the following is a specification.

My invention relates to new and useful improvements in chopping machines.

The object of the invention is to provide a simple machine of superior construction arranged to meet the requirements to which it might be subjected and to carry out its operation in a practical and efficient manner.

Finally the object of the invention is to provide a device of the character described that will be strong, durable and efficient, and simple, and comparatively inexpensive to construct, also one in which the several parts will not be liable to get out of working order.

With the above and other objects in view, my invention has particular relation to certain novel features of construction and operation, an example of which is described in the following specification and illustrated in the accompanying drawings, wherein:

Figure 1 is a plan view of my machine, Fig. 2 is a detail of the hoe connections, Fig. 3 is a detail of the hoes, Fig. 4 is a longitudinal sectional view, Fig. 5 is a detail of one of the raising devices, Fig. 6 is a partial elevation of one of the adjusting devices, and Fig. 7 is a detail of one of the frame hangers.

In the drawings, the numeral 1 designates the central beam of the frame which is bowed upward as shown in Fig. 4. At its forward end the beam has pivotal connection in the usual way to a front axle 2 supported on ground wheels 3 and having connection with a tongue 4. The upward bow of the central beam permits the front wheels to pass under it in turning around and thus the machine is permitted to be turned around in a very limited space. At its rear end the beam is secured upon an axle 5 which in turn is supported on rear ground wheels 6 having clutch hubs 7. Collars 8 are set-screwed upon the axle 5 upon each side of the beam and are provided with downwardly projecting frame hangers 9 having a plurality of openings 10.

Horizontal frames or castings 11 are provided at their central rear portions with pivot hooks 12 adapted to engage in the openings 10 of the hangers, as shown in Fig. 7. The height of the rear ends of the frames may thus be varied by engaging the hooks in the different openings. The frames extend forward and are provided at their inner sides with bearings 13 which receive forwardly extending shafts 14. At their forward ends the shafts have bearings in hangers 15 arranged to be adjusted as will be hereinafter described. On the shafts forward of the frames, hubs 16 are secured and provided with a plurality of radially extending arms 17 of which there may be any number desired. These arms 17 are designed to support hoes or chopping blades 18 and to be revolved transversely of the machine. In order to prevent damage to the hoes upon encountering obstructions as they revolve, they are secured to brackets 19 pivoted on the ends of the arms by bolts 20 and provided each with a curved slot 21 in concentric relation to center of the bolt 20 receiving a pin 22 projecting thereinto from the arm as shown in Fig. 2. This arrangement permits the bracket and hoe to swing upward a limited distance. For holding the bracket in place under normal working condition, a lug 23 projecting from the bracket is connected by a coiled spring 24 with a lug 25 extending from the arm.

Different forms of hoes may be used and they may be of various sizes. In Fig. 3 I have shown two forms of hoes, one having teeth or fingers 26 which is preferable under some conditions.

Suitable means, hereinafter described, being provided for revolving the shafts, the hoes are swung transversely of the machine and consequently of the rows as the machine is drawn forward and the cotton chopped or blocked out. It is obvious that the rows might be irregular and wide or narrow and that some means for adjusting the shafts must be provided. In carrying out this feature, a cross bar 27 is secured on the beam 1 so as to project on the sides thereof and is substantially square in cross section. On the ends of this bar sleeves 28 carrying inwardly extending rack bars 29 are mounted to slide. The rack bar of each sleeve is adapted to be engaged by a toothed segment 30 carried on the lower end of a lever 31 pivoted on the side of the bar 29, so that when this lever is swung, the sleeve will be slid longitudinally on the bar and transversely of the beam. On the side opposite to the lever 31, each sleeve has pivoted to its side, a bell-crank lever 32 provided with a plunger 33 adapted to engage a segment 34. The lower end of the lever 32 is connected to the hanger 15 hereinbefore referred to and when the said lever is swung, the forward end of the shaft is raised or lowered. Thus either shaft can be adjusted vertically.

It is apparent that the levers 32 having connection with the shafts 14 by the hangers 15 and being pivoted to the sleeves 28, when the sleeves are moved by the levers 31 and the rack bars 29, the shafts and hoes will be adjusted transversely of the machine and thus to suit narrow or wide rows.

For imparting motion to the shafts and revolving the hoes, a bevel gear 35 is secured on each shaft 14 adjacent the frame 11. The frames 11 are provided with bearings 36 supporting shafts 37 at substantially right angles to the shafts 14. These shafts 37 carry on their inner ends bevel gears 38 meshing with the gears 35; while on their outer ends, stepped sprockets 39 are fixed. One of the steps of each sprocket 39 is connected by a sprocket chain 40 with the corresponding step of a stepped sprocket 41 having a clutch hub 42. In this way a variable transmission is provided as by changing the chains from one step to the other, the speed may be varied. The clutch hubs 42 of the sprocket are normally held in engagement with the clutch hubs 7 by links 43 engaging loose rings 44 mounted on the hubs 42. These links have pivotal connection with levers 45 pivoted below said connection, to collars 46 held in position on the axle 5 by braces 47 extending from the beam 1 as shown in Fig. 1. By swinging the levers 45 toward the beam, the sprockets 41 are moved inward and their clutch hubs 42 drawn out of engagement with the clutch hubs 7 and the transmission of motion interrupted.

A seat 48 is mounted on the beam 1 in a position to permit the operator to grasp the various levers, while a foot rest 49 is supported from the beam.

Hangers 51 are supported from the under side of frame 11, as shown in Fig. 4. These hangers carry at their lower ends diverging horizontal arms 52 from which short standards 53 project downward. Cultivators 50 are suitably supported on the standards so as to follow the hoes or chopping blades.

What I claim, is:

1. In a cotton chopping machine, the combination with a wheel supported frame, and the axles thereof, of a transverse bar mounted upon the frame near its middle, a sleeve slidable upon said bar, means for manually shifting said sleeve, a chopper frame hung from the rear axle at its rear extremity and supported from said sleeve at its forward extremity, means by which vertical adjustment of the forward extremity of said frame may be manually accomplished, a shaft rotatably mounted in the chopper frame longitudinally thereof, mechanism communicating rotation to said shaft from the rear axle, and hoe blades resiliently supported from said shaft.

2. In a cotton chopping machine, the combination with front and rear wheels and axles, of a beam extending between said axles, a bar extending transversely of said beam in its middle portion, a sleeve slidable upon said bar at each side of the beam levers adapted to actuate said sleeves transversely upon the bar, a bell crank lever pivoted upon each sleeve, a frame mounted at each side of the beam, having its rear end pivotally supported from the rear axle and its front end suspended from an arm of the bell crank lever on the same side of the beam, a shaft rotatably mounted in each frame, mechanism adapted to communicate rotation to each shaft from the rear axle and hoes mounted on said shafts, resiliently supported.

In testimony whereof I have signed my name to this specification in the presence of two subscribing witnesses.

JOHN J. KILMAN.

Witnesses:
E. V. HARDWAY,
LELAN LEWIS.